US011989952B2

(12) United States Patent
Sun et al.

(10) Patent No.: US 11,989,952 B2
(45) Date of Patent: May 21, 2024

(54) SYSTEMS AND METHODS FOR TRAJECTORY PREDICTION

(71) Applicant: Samsung Electronics Co., Ltd., Suwon-si (KR)

(72) Inventors: Lin Sun, Mountain View, CA (US); Chenxu Luo, Sunnyvale, CA (US); Dariush Dabiri, Los Gatos, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 251 days.

(21) Appl. No.: 17/100,777

(22) Filed: Nov. 20, 2020

(65) Prior Publication Data

US 2021/0174668 A1 Jun. 10, 2021

Related U.S. Application Data

(60) Provisional application No. 62/946,284, filed on Dec. 10, 2019.

(51) Int. Cl.
*G06V 20/56* (2022.01)
*G06N 3/04* (2023.01)
(Continued)

(52) U.S. Cl.
CPC ............ *G06V 20/588* (2022.01); *G06N 3/04* (2013.01); *G06N 3/08* (2013.01); *G06V 10/82* (2022.01);
(Continued)

(58) Field of Classification Search
CPC ............ G08G 1/01; G08G 1/123; G06N 3/04; G06N 3/08; G06V 10/82; G06V 20/58;
(Continued)

(56) References Cited

U.S. PATENT DOCUMENTS

2009/0067675 A1\* 3/2009 Tan ...................... G01S 13/931
382/104
2010/0214155 A1\* 8/2010 Harada ............... B60R 21/0134
342/147
(Continued)

FOREIGN PATENT DOCUMENTS

WO WO-2018172460 A1 \* 9/2018

OTHER PUBLICATIONS

Chai, Yuning et al., "MultiPath: Multiple Probabilistic Anchor Trajectory Hypotheses for Behavior Prediction," arXiv:1910.05449v1, Oct. 12, 2019, 3$^{rd}$ Conference on Robot Learning (CoRL 2019), Osaka, Japan, 14 pages.
(Continued)

*Primary Examiner* — Mohamed Barakat
*Assistant Examiner* — Rufus C Point
(74) *Attorney, Agent, or Firm* — Lewis Roca Rothgerber Christie LLP (57) ABSTRACT

Systems and methods for predicting a location of a target vehicle are disclosed. A processor receives trajectory information for the target vehicle and determines a trajectory feature based on the trajectory information. The processor further determines a lane feature of a lane within a threshold vicinity of the target vehicle, and determines a probability associated with the lane based on the trajectory feature and the lane feature. The lane that the vehicle may enter is identified based on the probability. The processor may also generate interactive features of interactions between the target vehicle and other vehicles. The processor predicts a location of the target vehicle in an upcoming time period based on the lane feature and the trajectory feature. In some embodiments, the interactive features are also used for the prediction.

16 Claims, 4 Drawing Sheets

(51) Int. Cl.
    *G06N 3/08*     (2023.01)
    *G06V 10/82*     (2022.01)
    *G06V 20/58*     (2022.01)
    *G08G 1/01*     (2006.01)
    *G08G 1/123*     (2006.01)

(52) U.S. Cl.
    CPC ............... *G06V 20/58* (2022.01); *G08G 1/01* (2013.01); *G08G 1/123* (2013.01)

(58) Field of Classification Search
    CPC . G06V 20/588; G06K 9/6271; B60W 60/001; B60W 50/00; B60W 2050/0005; B60W 40/06; B60W 50/0097; B60W 2050/0026; B60W 2520/10; G05D 1/0212; G05D 1/0268; G05D 2201/0213
    See application file for complete search history.

(56) References Cited

U.S. PATENT DOCUMENTS

| | | | | |
|---|---|---|---|---|
| 2010/0245171 | A1* | 9/2010 | Zeng | G01S 5/0289 342/357.34 |
| 2017/0154225 | A1 | 6/2017 | Stein | |
| 2017/0200061 | A1* | 7/2017 | Julian | G06V 20/56 |
| 2018/0189578 | A1* | 7/2018 | Yang | B60W 40/04 |
| 2018/0304891 | A1 | 10/2018 | Heidenreich et al. | |
| 2019/0077398 | A1 | 3/2019 | Kusano et al. | |
| 2019/0113929 | A1 | 4/2019 | Mukadam et al. | |
| 2019/0220015 | A1 | 7/2019 | Phillips et al. | |
| 2020/0090042 | A1 | 3/2020 | Wayne et al. | |
| 2020/0226426 | A1* | 7/2020 | Jarquin Arroyo | G06F 18/217 |
| 2021/0104155 | A1* | 4/2021 | Xu | B60W 50/14 |

OTHER PUBLICATIONS

Deo, Nachiket, et al., "Multi-Modal Trajectory Prediction of Surrounding Vehicles with Maneuver based LSTMs," 2018 IEEE Intelligent Vehicles Symposium (IV), Jun. 2018, 6 pages.

Kim, ByeoungDo, et al., "Probabilistic Vehicle Trajectory Prediction over Occupancy Grid Map via Recurrent Neural Network," Apr. 2017, 6 pages.

Pan, Jiacheng, et al., "Lane-Attention: Predicting Vehicles' Moving Trajectories by Learning Their Attention over Lanes," Sep. 2019, 9 pages.

Schreier, Matthias, et al., "An Integrated Approach to Maneuver-Based Trajectory Prediction and Criticality Assessment in Arbitrary Road Environments," IEEE Transactions on Intelligent Transportation Systems, IEEE, vol. 17, No. 10, Oct. 2016, pp. 2751-2766.

Wissing, Christian, et al., "Lane Change Prediction by Combining Movement and Situation based Probabilities," IFAC Papersonline, vol. 50, Jul. 2017, pp. 3554-3559.

Zhu, Jiacheng, et al., "Probabilistic Trajectory Prediction for Autonomous Vehicles with Attentive Recurrent Neural Process," Oct. 2019, 7 pages.

EPO Extended European Search Report dated May 11, 2021, issued in corresponding European Patent Application No. 20212472.3, (10 pages).

* cited by examiner

SYSTEMS AND METHODS FOR TRAJECTORY PREDICTION

CROSS-REFERENCE TO RELATED APPLICATION(S)

The present application claims priority to and the benefit of U.S. Provisional Application No. 62/946,284, filed Dec. 10, 2019, entitled "SYSTEM AND METHOD FOR CONTROLLING AUTONOMOUS VEHICLE," the entire content of which is incorporated herein by reference.

FIELD

One or more aspects of embodiments according to the present disclosure relate to autonomous vehicles, and more particularly to predicting future trajectories of autonomous vehicles.

BACKGROUND

A self-driving vehicle (autonomous vehicle) engages in various tasks to safely maneuver itself in a current environment. One of such tasks is predicting its future trajectory as well as the trajectory of surrounding vehicles. Trajectory prediction, however, may often be challenging due to the inherent uncertainty of the future, and the complexity of the environment navigated by the vehicle. Trajectory prediction may also be challenging as the driver's intention often determines trajectory, and intention may be hard to estimate. It is desirable, therefore, to have a system and method that tackles the challenging task of trajectory prediction for autonomous vehicles.

The above information disclosed in this Background section is only for enhancement of understanding of the background of the present disclosure, and therefore, it may contain information that does not form prior art.

SUMMARY

Embodiments of the present disclosure are directed to a method for predicting a location of a target vehicle. A processor receives trajectory information for the target vehicle and determines a trajectory feature based on the trajectory information. The processor further determines a lane feature of a lane within a threshold vicinity of the target vehicle, and determines a probability associated with the lane based on the trajectory feature and the lane feature. The lane is identified based on the probability. The processor predicts a location of the target vehicle in an upcoming time period based on the lane feature and the trajectory feature.

According to one embodiment, the trajectory information includes position histories and velocity histories of the target vehicle.

According to one embodiment, the determining of the trajectory feature includes: encoding the position histories into a first vector; encoding velocity histories into a second vector; and concatenating the first vector and the second vector.

According to one embodiment, the information of a lane includes a set of ordered points sampled from a center of the lane.

According to one embodiment, the threshold vicinity includes a threshold radius from the target vehicle.

According to one embodiment, the determining of the lane feature includes invoking a neural network for extracting one or more features of the lane and storing the one or more features in a vector.

According to one embodiment, the extracting of the one or more features of the lane is via a convolutional neural network.

According to one embodiment, the determining the probability associated with the lane includes determining a probability that the target vehicle will enter the lane.

According to one embodiment, the processor further receives a second trajectory information for a second vehicle; determines a second trajectory feature based on the second trajectory information; and determines an interaction feature based on the trajectory feature and the second trajectory feature. The predicting, by the processor, of the future location of the target vehicle may be based on the lane feature, the trajectory feature, and the interaction feature.

According to one embodiment, the processor further determines a second lane feature of a second lane within the threshold vicinity of the target vehicle; and determines a second probability associated with the second lane based on the trajectory feature and the second lane feature. The predicting by the processor may include predicting a second location of the target vehicle in the upcoming time period based on the second lane feature, and the trajectory feature.

Embodiments of the present disclosure are also directed to a system for predicting a location of a target vehicle. The system includes a processor and a memory. The memory stores instructions that, when executed, cause the processor to: receive trajectory information for the target vehicle; determine a trajectory feature based on the trajectory information; determine a lane feature of a lane within a threshold vicinity of the target vehicle; determine a probability associated with the lane based on the trajectory feature and the lane feature; identify the lane based on the probability; and predict a location of the target vehicle in an upcoming time period based on the lane feature and the trajectory feature.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Trajectory prediction, which includes predicting a future location of an object, is one of various tasks executed by autonomous vehicles. For autonomous driving, trajectories of vehicles may be influenced by lane geometry. For example, when driving, drivers usually pay attention to one or more traffic lanes based on one's intention or goal. Drivers will generally either follow the current lane or drive towards an intended lane. Thus, it is desirable to consider the traffic lanes that surround a target vehicle in order to predict the vehicle's future movements.

In general terms, embodiments of the present disclosure are directed to systems and methods for predicting a future trajectory of a target vehicle based on traffic lanes in a local vicinity of the vehicle. The lane information may be used to predict one or more target lanes that the vehicle is likely to move into. One or more trajectory predictions may then be made, along with associated probabilities, based on the predicted target lanes.

In one embodiment, a lane in the local vicinity of a target vehicle is represented by a set of ordered points. An advantage of representing the lane via the set of ordered points is that it may be more memory efficient than a rasterized map. In addition, a local map may provide local information which may be more accurate than a global rasterized map for a target vehicle. In one embodiment, a lane encoder extracts a fixed-length vector for the lane representation. The lane representation information may be provided to a lane attention module for predicting a probability that the target vehicle will enter the lane. For autonomous driving, there may be several lanes that the target vehicle may possibly enter given a current observation of the vehicle and uncertainty of the driver's intention. In one embodiment, the probability of each of the various lanes may be used for considering different plausible trajectories for the target vehicle.

Figure 1:
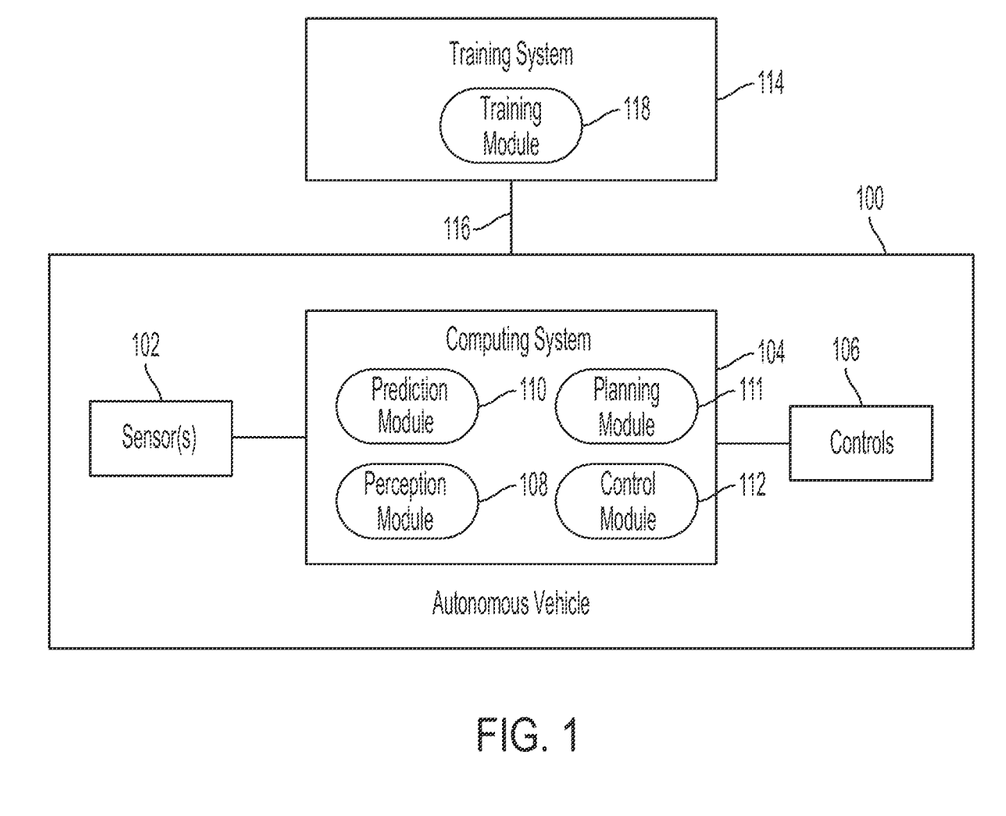
FIG. 1 is a block diagram of a system for controlling navigation of a target autonomous vehicle according to one embodiment.

FIG. 1 is a block diagram of a system for controlling navigation of a target autonomous vehicle 100 according to one embodiment. The autonomous vehicle 100 may be a land vehicle (e.g. a car), an air vehicle (e.g. an airplane), or the like (e.g. water vehicle). Embodiments of the present disclosure may also be applied in contexts other than controlling navigation of an autonomous vehicle. For example, embodiments of the present disclosure may extend to augmented reality applications, driver/pilot assistance applications, mapping applications, and/or other applications where trajectory prediction may be desired.

The autonomous vehicle 100 may include one or more sensors 102, a computing system 104, and one or more vehicle controls 106. The one or more sensors 102 may include a Light Detection and Ranging (LiDAR) system, a Radio Detection and Ranging (RADAR) systems, one or more cameras, a geographic positioning system, and the like. The sensors may be configured to provide information of objects in a vicinity of the autonomous vehicle. The objects may be traffic signal lights, other vehicles, pedestrians, and the like.

The computing system 104 may include one or more processors and a memory.

The memory may store instructions that, when executed by the one or more processors, cause the one or more processors to execute the various operations described herein. In one embodiment, the instructions cause the one or more processors to estimate a future location/trajectory of the autonomous vehicle, and control the autonomous vehicle accordingly.

In one embodiment, the vehicle computing system 104 includes, without limitation, a perception module 108, prediction module 110, motion planning module 111, and control module 112. Although the various modules 108-112 are assumed to be separate functional units, a person of skill in the art will recognize that the functionality of the modules may be combined or integrated into a single module, or further subdivided into further sub-modules without departing from the spirit and scope of the inventive concept.

In one embodiment, the perception module 108 is configured to identify one or more objects based on sensor data from the one or more sensors 102, and map data about the surrounding environment. The map data may include local map data of the lanes that are within a threshold vicinity of the autonomous vehicle. The perception module 108 may use the sensor data and map data to identify a current state of objects in the vicinity of the autonomous vehicle. The current state information may include, for example, trajectory of moving objects near the autonomous vehicle, as well as classification of the objects as vehicles, pedestrians, and the like.

The prediction module 110 may include one or more neural networks, such as, for example, one or more convolutional neural networks (CNN), recurrent neural networks (RNN), long short-term memory (LSTM) recurrent neural networks, gated recurrent units (GRUs) and/or the like. The neural network that is employed may include different number of layers and different number of nodes within each layer of the neural network. The one or more neural networks may be trained, among other things, to extract relevant features for the inputs to the networks, generate predictions of one or more lanes that the autonomous vehicle may like enter, and/or predict one or more future trajectories for the autonomous vehicle. The output of the prediction module 110 may be, for example, the predicted future trajectories of the autonomous vehicle, along with associated probability values.

In one embodiment, the predicted future trajectories from the prediction module 110 are provided to the motion planning module 111. In one embodiment, the motion planning module 111 may be configured to determine a motion plan for the autonomous vehicle 100, based on the predicted future trajectories and associated probability values. In this regard, the motion planning module 111 may generate a motion plan that follows one of the predicted future trajectories in a safe manner.

In one embodiment, the control module 112 generates commands to the vehicle controls 106 to control the autonomous vehicle 100 according to the motion plan by the motion planning module 111. The one or more vehicle controls 106 may include, without limitation, actuators or other devices which control gas flow, acceleration, steering, braking, and/or the like. Based on commands from the control module 112, the vehicle controls 106 may cause the autonomous vehicle 100 to move, stop, or take another desired action.

In one embodiment, the computing system 104 is coupled to a training system 114 over a data communications network 116. The data communications network may be a local area network, private wide area network (WAN), and/or public wide area network such as, for example, the Internet. In some embodiments, the communications network may include a wireless carrier network including a code division multiple access (CDMA) network, global system for mobile communications (GSM) network, or any wireless network/technology conventional in the art, including but to limited to 3G, 4G, 5G, LTE, and the like.

The training system 114 may include one or more processors and memory.

The memory may store instructions that, when executed by the one or more processors, cause the one or more processors to train the one or more neural networks for predicting a future trajectory of a target vehicle. In this regard, the training system 114 may include a training module 118 for training the one or more neural networks using one or more training or learning algorithms. One example training technique is backwards propagation of errors.

In one embodiment, the training module 118 employs supervised learning techniques to train the one or more neural networks using training data. The training data may include, for example, ground truth data. Ground truth data may be, for example ground-truth lanes and ground-truth trajectories. In one embodiment, the training of the one or more neural networks includes providing a portion of the ground truth data to the one or more neural networks to make predictions. For example, the one or more neural networks may output predicted lane intention classifications, predicted trajectories, and/or the like. The prediction results may be used by the training module 118 to apply or compute a loss function that compares the predictions to the ground truth data that the neural network attempted to predict. The training module 118 may be configured to backpropagate the loss function through the one or more neural networks, to train the one or more neural networks by modifying, for example, one or more weights associated with the one or more neural networks.

The process of inputting ground truth data, determining a loss function, and backpropagating the loss function, may be repeated numerous times with different training data until convergence is achieved, at which point the one or more neural networks may be deemed to be trained.

Figure 2:
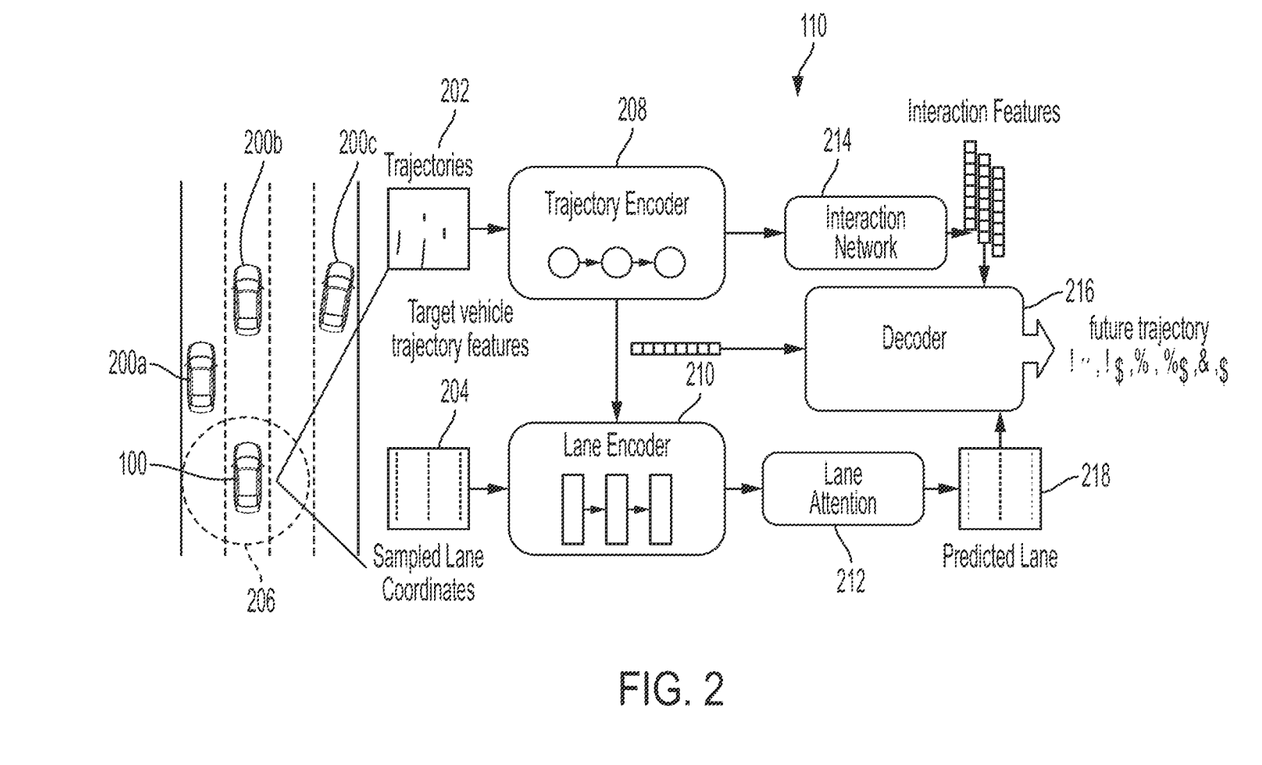
FIG. 2 is a conceptual layout diagram of a prediction module running in the target vehicle according to one embodiment.

FIG. 2 is a conceptual layout diagram of the prediction module 110 running in the target vehicle 100 according to one embodiment. In one embodiment, the one or more sensors 102 of the target vehicle 100 capture and provide sensor data of nearby objects. The nearby objects may be, for example, other vehicles 200a-200c (collectively referenced as 200) near the target vehicle 100. The target vehicle 100 and nearby vehicles 200 may also be referred to as agents.

In one embodiment, the one or more sensors 102 installed in the target vehicle 100 captures velocity and position information of the nearby vehicles 200, as well as the velocity and position information of the target vehicle 100. The position and velocity information may be captured over multiple time steps, and used by the perception module 108 for determining a trajectory 202 of the target vehicle 100 and the nearby vehicles 200.

In one embodiment, the perception module 108 is further configured to obtain a local map including a set of ordered lane-points (e.g. geographic x, y coordinates) 204 of the center of the lanes within a threshold vicinity/distance 206 of the target vehicle 100. The threshold vicinity may include, for example, an area measured by a radius using the target vehicle 100 as the center. The local map may be generated based on the lane lines sensed by the one or more sensors 102. The local map may also be derived by localizing the target vehicle's position, and then fetching the lanes within the threshold vicinity from a pre-collected map stored in a storage device.

In one embodiment, the prediction module 110 includes a trajectory encoder 208, lane encoder 210, attention module 212, interaction network module 214, and a trajectory decoder 216. Although the various components 208-216 of the prediction module 110 are assumed to be separate functional units, a person of skill in the art will recognize that the functionality of the modules may be combined or integrated into a single module, or further subdivided into further sub-modules without departing from the spirit and scope of the inventive concept.

The trajectory encoder 208 may include one or more be neural networks (e.g. LSTM, GRU, or the like) trained to extract and encode features of the trajectories for the target vehicle 100 and nearby vehicles 200. In one embodiment, the trajectory encoder 208 includes a first neural network for encoding position histories of an agent into a first vector, and a second neural network for encoding velocity histories of the agent in a second vector. The two extracted features may then be concatenated to form a motion/trajectory feature vector $f_{TRi}$ for the agent as follows:

$$f_{TRi}=g_1(X^i)\|g_2(V^i)$$

where $X^i$ and $V^i$ are the sequence of position and velocities for the i-th agent, respectively; $g_1$ and $g_2$ are LSTM modules for position and velocity; and $\|$ is the concatenation.

The lane encoder 210 may include one or more neural networks trained to extract and encode features of lane segments within the threshold vicinity 206 of the target vehicle 100. In one embodiment, the lane encoder 210 includes a convolutional neural network with one or more convolutional layers (e.g. two 1-dimensional convolutional layers) and a multiple layer perceptron (MLP), for extracting lane features based on the set of ordered lane-points 204 of the lane segments. The final output of the convolutional neural network may be pooled and stored in a fixed size feature vector for each lane. As opposed to using rasterized maps to extract feature representations for an entire scene surrounding the target vehicle 100, the use of local maps for extracting features of only the lanes in the vicinity of the target vehicle is lightweight and more memory efficient.

The lane feature vectors for the lanes generated by the lane encoder 210, and the trajectory feature vector for the target vehicle 100 that is generated by the trajectory encoder 208, are used by the lane attention module 212 for identifying one or more target lanes that are predicted to be the goal of the target vehicle in the upcoming future (e.g. in the next 3 seconds). It is not uncommon for drivers to have their attention on one or a few of the lanes based on their intention. The drivers tend to follow the direction of one of those lanes that is subject of their intention, determining the trajectory of the target vehicle.

In one embodiment, the lane attention module 212 may include one or more neural networks built with a deep learning concept known as "attention." In this regard, softmax function may be invoked for correlating the trajectory of the target vehicle 100 with the lanes in the vicinity of the target vehicle, for determining a probability distribution for the lanes. The probability distribution may describe the likelihood that the target vehicle 100 will enter the various lanes. In one embodiment, the output of the lane attention module 212 is the lane feature of the lane identified as a target lane that satisfies a threshold probability of being entered by the target vehicle 100. The target lane feature may be output with the associated probability information. In one embodiment, the lane attention module 212 outputs the lane features of alternative target lanes along with their corresponding probabilities.

The interaction network module 214 may be configured to model the interactions between the various agents 100, 200. In some situations, the future trajectory of the target vehicle may not only be influenced by the lanes that are subject to the driver's attention, but may also be influenced by interactions with the other vehicles 200. In one embodiment, the interaction network module 214 is similar to the lane attention module 212 in that it includes one or more neural networks with an attention layer. In this regard, the interaction network module 214 takes the trajectory feature vectors of the other vehicles 200 ($f_{TR_j}$), and the trajectory feature vector of the target vehicle 100 ($f_{TR_v}$), for computing an interaction weight $w_{vj}$ between the target vehicle v, and the j-th vehicle as follows:

$$w_{vj} = \frac{\exp[(W_I^T \, f_{TR_v})^T \cdot (W_I^T \, f_{TR_j})]}{\sum_o \exp[(W_I^T \, f_{TR_v})^T \cdot (W_I^T \, f_{TR_o})]}$$

where, $W_I$ is a weight of a feature embedding layer for the target vehicle trajectory and the various trajectories. In one embodiment, the interaction network module 214 uses the computed interaction weight for outputting a final interaction feature fact for modeling an interaction between the target vehicle v and the j-th vehicle as follows:

$$f_{act} = \sum_{j \neq v} w_{vj} \cdot f_{TR_j}$$

In one embodiment, the interaction network module 214 outputs an interaction feature for the interactions between the target vehicle and all other vehicles 200 in the vicinity of the target vehicle 100.

In one embodiment, the decoder module 216 is a standard LSTM network or any other recurrent neural network. The decoder module 216 may be configured to receive the trajectory feature of the target vehicle 100, the interaction features generated by the interaction network module 214, and the feature of the target lane generated by the lane attention module 212, and output a future trajectory predicted for the target vehicle 100. In one embodiment, the predicted future trajectory may include predicted positions (x, y) at each timestamp t, using a bi-variate Gaussian distribution as follows:

$$\mathcal{N}(x_v^t, y_v^t, \mu_x^t, \mu_y^t, \sigma_x^t, \sigma_y^t, \rho_t)$$

where ($\mu_x^t, \mu_y^t$) is a mean and ($\sigma_x^t, \sigma_y^t, \rho_t$) is a variance at each time stamp t.

In one embodiment, the decoder 216 is configured to output one or more trajectory predictions, and assign each prediction a probability. In this regard, different target lane features from the lane attention module 212 may be fed to the decoder 216 for generating a corresponding prediction and associated probability. In this regard, the different target lane features may be viewed as an intent of the autonomous vehicle. Instead of the intent being one of various fixed intents (e.g. turning or changing lanes), the intent set according to the various embodiments is a set of target lanes, which is dynamic and flexible to deal with different driving scenarios.

Figure 3:
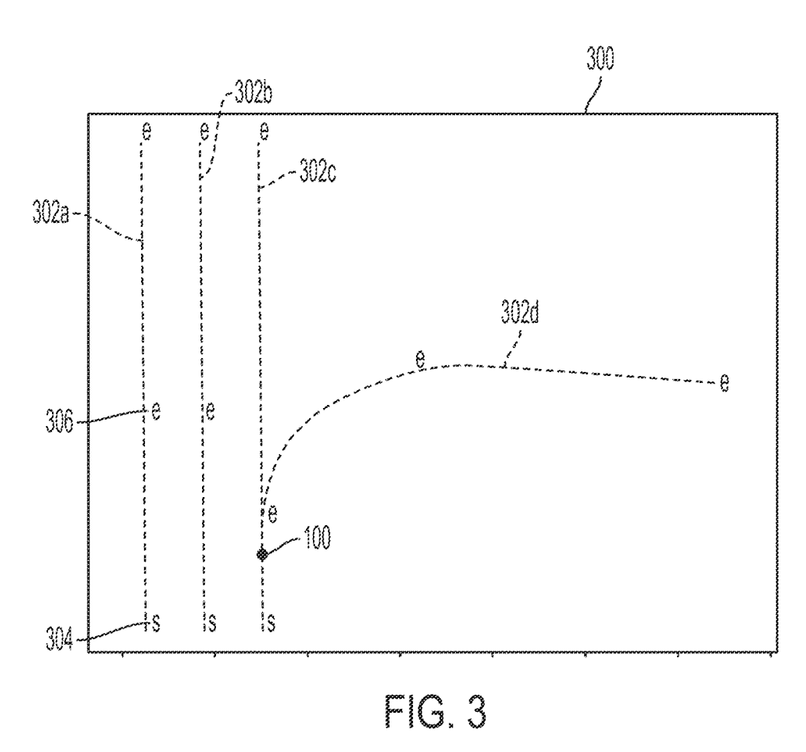
FIG. 3 is a conceptual layout diagram of a local map according to one embodiment.

FIG. 3 is a conceptual layout diagram of a local map 300 of lanes 302a-302d (collectively referenced as 302) within a vicinity of a target vehicle 100 according to one embodiment. The local map 300 may update as the position of the target vehicle 100 changes. In one embodiment, a segment of a center of the lane 302 is identified by a start point 304 and an end point 306. In one embodiment, the local map 300 provides a series of geographic coordinates of the lane segment to the lane encoder 210 for extracting the features of the lane.

Figure 4:
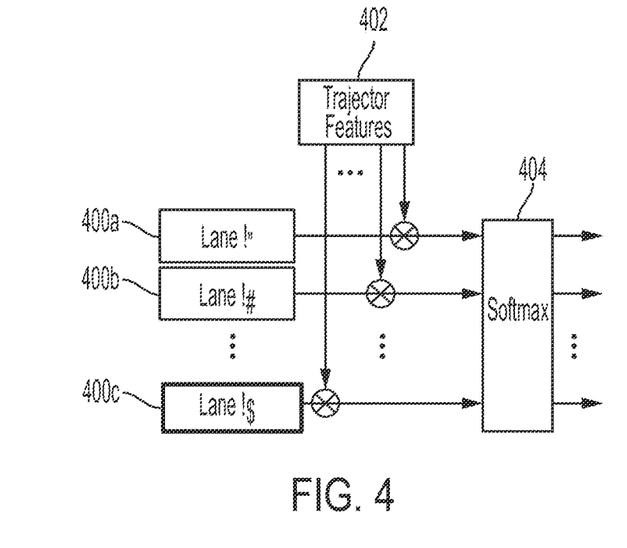
FIG. 4 is a conceptual layout diagram of a lane attention module according to one embodiment.

FIG. 4 is a conceptual layout diagram of the lane attention module 212 according to one embodiment. It should be appreciated that the lane attention module 212 according to the various embodiments is flexible in that it may deal with a varying number of lanes in the dynamic driving environment. In this regard, the lane attention module 212 may receive as input, a varying number of lane feature vectors 400a-400c (collectively referenced as 400) produced by the lane encoder module 210. The lane attention module may also receive as input, the trajectory feature vector 402 for the target vehicle 100. In one embodiment, a dot product computation is performed between each lane feature vector 400 and the trajectory feature vector 402 for producing an attention score for each lane. The generated scores may run through a normalization layer 404 such as, for example, a softmax layer. The normalization layer 404 may be configured to normalize the scores into a probability distribution that includes a probability associated with each lane. Assuming that the lane features of n possible lanes are $I_1$, $I_2$, ..., $I_n$, the probability for each lane may be calculated as follows:

$$\hat{p}_i = \frac{\exp((W_t^T \, f_{TR_t})^T \cdot (W_l^T f \mid_{l_i}))}{\sum_{j=1}^{n} \exp((W_t^T \, f_{TR_t})^T \cdot (W_l^T f_{l_j}))}$$

In one embodiment, the interaction network module 214 includes a structure similar to the lane attention module 212, except instead of using the lane feature vectors for the dot product calculation with the trajectory feature of the target vehicle 100, the trajectory feature vectors of the other vehicles 200 in the vicinity of the target vehicle 100, are used.

In one embodiment, the training module 118 uses one or more loss functions for training the one or more neural networks used by the prediction module 110. The one or more loss functions may include a lane intention loss function for lane intention classification as follows:

$$\mathcal{L}_{lane} = -\frac{1}{n} \sum_{i=1}^{n} p_i \, \log(\hat{p}_i)$$

where n is a number of the lanes in the local map.

The one or more loss functions may also include a trajectory loss function for predicting a location/position of the target vehicle as follows:

$$L_{pos} = -\sum_{t=1}^{t_h} \log P(x_v^t, y_v^t \mid \mu_x^t, \mu_y^t, \sigma_x^t, \sigma_y^t, \rho_t)$$

In one embodiment, the training module 118 uses the lane intention loss and the trajectory loss as a final loss for training the one or more neural networks used by the prediction module 110. Once trained, the prediction module 110 may be used for predicting future locations/trajectories of the target vehicle 100.

Figure 5:
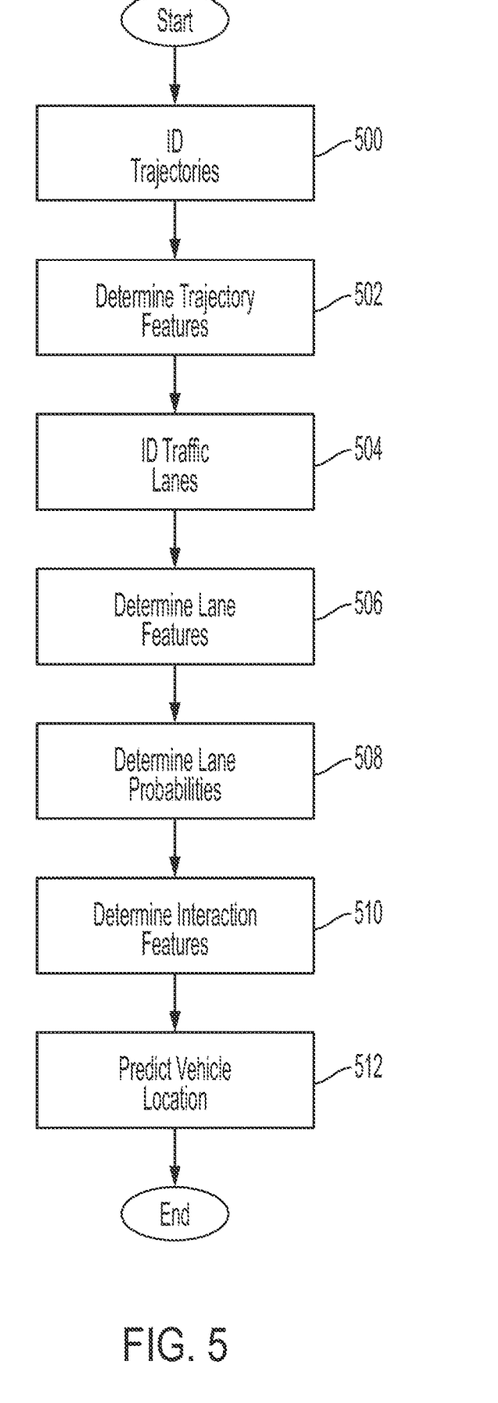
FIG. 5 is a flow diagram of a process for predicting a location of a target vehicle according to one embodiment.

FIG. 5 is a flow diagram of a process for predicting a location of a target vehicle according to one embodiment. It should be understood that the sequence of steps of the process is not fixed, but can be modified, changed in order, performed differently, performed sequentially, concurrently, or simultaneously, or altered into any desired sequence, as recognized by a person of skill in the art.

The process starts, and at block 500, the perception module 108 identifies the trajectories of the target vehicle 100 and nearby vehicles 200. The trajectory identification may be based on sensor data (e.g. velocity and position information) provided by the one or more sensors 102.

At block 502, the trajectory encoder module 208 uses the trajectory information for determining trajectory features for the target vehicle 100 and any nearby vehicles 200.

At block 504, the perception module identifies information on lane segments for one or more lanes within a threshold vicinity of the target vehicle 100. In one embodiment, the information includes an ordered set geographic coordinates along a center line of the lanes.

At block 506, the lane encoder module 210 uses the lane coordinates for determining lane features for the identified lanes.

At block 508, the lane attention module 212 uses the lane features and the trajectory feature of the target vehicle 100 for determining a lane probability for each of the lanes. The lane probabilities may be interpreted as the intent of the autonomous vehicle to enter the lane.

At block 510, the interaction network module 214 uses the trajectory features of the target vehicle 100 and the nearby vehicles 200 for modeling an interaction of the nearby vehicles with the target vehicle. The modeled interaction between the target and a nearby vehicle may be output as an interaction feature vector. A separate interaction feature vector may be created to model an interaction between the target vehicle 100 and each of the nearby vehicles 200.

At block 512, the decoder module 216 receives as inputs the trajectory feature of the target vehicle 100, interaction features generated by the interaction network module 214, and the lane feature of a target lane generated by the lane attention module 212, for predicting a vehicle location/trajectory of the target vehicle. The prediction may be accompanied by a corresponding probability value. In one embodiment, different lane features of different target lanes are fed, one by one, to the decoder module 216, for generating different trajectory predictions along with associated probabilities. In this manner, the planning module 111 of the target vehicle may consider the various trajectories in planning a path for the target vehicle.

In some embodiments, the system and method for predicting a location of a target vehicle discussed above, are implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for predicting a location of a target vehicle have been specifically described and illustrated herein, many modifications and variations will be apparent to those skilled in the art. Accordingly, it is to be understood that a system and method for predicting a location of a target vehicle constructed according to principles of this disclosure may be embodied other than as specifically described herein. The disclosure is also defined in the following claims, and equivalents thereof.

What is claimed is:

1. A method for predicting a location of a target vehicle, the method comprising:
    receiving, by a processor, trajectory information for the target vehicle;
    determining, by the processor, a trajectory feature for the target vehicle based on the trajectory information, wherein the trajectory feature includes velocity and position information for the target vehicle;
    determining, by the processor, a first lane feature of a first lane and a second lane feature of a second lane, wherein the first lane and the second lane are within a threshold vicinity of the target vehicle, wherein the determining of the first lane feature includes identifying a first geographic coordinate of the first lane, and the determining of the second lane feature includes identifying a second geographic coordinate of the second lane;
    determining, by the processor, a first probability associated with the first lane based on the trajectory feature and the first lane feature, and a second probability associated with the second lane based on the trajectory feature and the second lane feature, wherein the first probability is indicative of a first likelihood that the target vehicle will enter the first lane, and the second probability is indicative of a second likelihood that the target vehicle will enter the second lane;
    identifying, by the processor, at least one of the first lane or the second lane based on a consideration of the first probability and the second probability; and
    predicting, by the processor, a location of the target vehicle in an upcoming time period based on at least one of the first lane feature or the second lane feature, and the trajectory feature.

2. The method of claim 1, wherein the trajectory information includes position histories and velocity histories of the target vehicle.

3. The method of claim 2, wherein the determining of the trajectory feature includes:
    encoding the position histories into a first vector;
    encoding velocity histories into a second vector; and
    concatenating the first vector and the second vector.

4. The method of claim 1, wherein at least one of the first lane or the second lane is identified based on a set of ordered points sampled from a center of respectively the first lane or the second lane, wherein the set of ordered points is provided by a local map.

5. The method of claim 1, wherein the threshold vicinity includes a threshold radius from the target vehicle.

6. The method of claim 1, wherein the determining of at least one of the first lane feature or the second lane feature includes invoking a neural network for extracting one or more features of respectively the first lane or the second lane, and storing the one or more features in a vector.

7. The method of claim 6, wherein the extracting of the one or more features of respectively the first lane or the second lane is via a convolutional neural network.

8. The method of claim 1 further comprising:
    receiving, by the processor, a second trajectory information for a second vehicle;
    determining, by the processor, a second trajectory feature based on the second trajectory information; and
    determining, by the processor, an interaction feature based on the trajectory feature and the second trajectory feature,
    wherein the predicting, by the processor, of the location of the target vehicle is based on at least one of the first lane feature or the second lane feature, the trajectory feature, and the interaction feature.

9. A system for predicting a location of a target vehicle, the system comprising:
    a processor; and
    a memory, wherein the memory stores instructions that, when executed, cause the processor to:
        receive trajectory information for the target vehicle;
        determine a trajectory feature for the target vehicle based on the trajectory information, wherein the trajectory feature includes velocity and position information for the target vehicle;
        determine a first lane feature of a first lane and a second lane feature of a second lane, wherein the first lane and the second lane are within a threshold vicinity of the target vehicle, wherein the instructions that cause the processor to determine the first lane feature include instructions that cause the processor to identify a first geographic coordinate of the first lane, and the instructions that cause the processor to determine the second lane feature include instructions that cause the processor to identify a second geographic coordinate of the second lane;
        determine a first probability associated with the first lane based on the trajectory feature and the first lane feature, and a second probability associated with the second lane based on the trajectory feature and the second lane feature, wherein the first probability is indicative of a first likelihood that the target vehicle will enter the first lane, and the second probability is indicative of a second likelihood that the target vehicle will enter the second lane;
        identify at least one of the first lane or the second lane based on a consideration of the first probability and the second probability; and
        predict a location of the target vehicle in an upcoming time period based on at least one of the first lane feature or the second lane feature, and the trajectory feature.

10. The system of claim 9, wherein the trajectory information includes position histories and velocity histories of the target vehicle.

11. The system of claim 10, wherein the instructions that cause the processor to determine the trajectory feature include instructions that cause the processor to:
  encode the position histories into a first vector;
  encode velocity histories into a second vector; and
  concatenate the first vector and the second vector.

12. The system of claim 9, wherein at least one of the first lane or the second lane is identified based on a set of ordered points sampled from a center of respectively the first lane or the second lane, wherein the set of ordered points is provided by a local map.

13. The system of claim 9, wherein the threshold vicinity includes a threshold radius from the target vehicle.

14. The system of claim 9, wherein the instructions that cause the processor to determine at least one of the first lane feature or the second lane feature include instructions that cause the processor to invoke a neural network for extracting one or more features of respectively the first lane or the second lane, and store the one or more features in a vector.

15. The system of claim 14, wherein the extracting of the one or more features of respectively the first lane or the second lane is via a convolutional neural network.

16. The system of claim 9, wherein the instructions further cause the processor to:
  receive a second trajectory information for a second vehicle;
  determine a second trajectory feature based on the second trajectory information; and
  determine an interaction feature based on the trajectory feature and the second trajectory feature,
  wherein the predicting of the location of the target vehicle is based on at least one of the first lane feature or the second lane feature, the trajectory feature, and the interaction feature.

\* \* \* \* \*